(12) United States Patent
Ohtaka

(10) Patent No.: US 10,926,746 B2
(45) Date of Patent: Feb. 23, 2021

(54) HYDRAULIC PRESSURE CONTROL UNIT

(71) Applicant: Robert Bosch GmbH, Stuttgart (DE)

(72) Inventor: Jun Ohtaka, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 5 days.

(21) Appl. No.: 16/415,375

(22) Filed: May 17, 2019

(65) Prior Publication Data

US 2019/0359192 A1    Nov. 28, 2019

(30) Foreign Application Priority Data

May 22, 2018    (JP) .............................. JP2018-097794

(51) Int. Cl.
| | | |
|---|---|---|
| *B60T 13/68* | (2006.01) | |
| *B60T 8/32* | (2006.01) | |
| *B60T 8/42* | (2006.01) | |
| *B60T 8/40* | (2006.01) | |
| *B60T 8/36* | (2006.01) | |

(52) U.S. Cl.
CPC ............ *B60T 8/328* (2013.01); *B60T 8/3225* (2013.01); *B60T 8/3685* (2013.01); *B60T 8/4027* (2013.01); *B60T 8/4275* (2013.01)

(58) Field of Classification Search
CPC ...... B60T 8/328; B60T 8/3225; B60T 8/3685; B60T 8/4027; B60T 8/4275; B60T 13/662; B60T 13/686
See application file for complete search history.

(56) References Cited

U.S. PATENT DOCUMENTS

| 6,111,514 A * | 8/2000 | Cossins .................. B60T 8/885 340/654 |
| 6,188,562 B1 * | 2/2001 | Lutz ......................... B60T 8/36 361/154 |
| 7,540,572 B2 * | 6/2009 | Nakamura ................ B60T 8/36 303/119.2 |
| 7,734,408 B2 * | 6/2010 | Shiraki ..................... B60L 7/24 701/80 |
| 7,881,849 B2 * | 2/2011 | Shiraki ..................... H02P 3/04 701/70 |

(Continued)

FOREIGN PATENT DOCUMENTS

| JP | S55-8539 A | 1/1980 |
| JP | S55-8539 U | 1/1980 |
| JP | 5-58539 U | 8/1993 |

*Primary Examiner* — Thomas W Irvin

(74) *Attorney, Agent, or Firm* — Maginot, Moore & Beck LLP

(57) ABSTRACT

The present disclosure obtains a hydraulic pressure control unit capable of appropriately diagnosing presence or absence of fixation of an electromagnetic valve. In the hydraulic pressure control unit according to the present disclosure, a controller includes: an acquisition section that acquires a current value of a current flowing through a coil of the electromagnetic valve in a hydraulic pressure control mechanism; and a diagnosis section that determines whether the current value has exhibited behavior of being temporarily reduced in a process in which the current value is increased at initiation of applying the current to the coil of the electromagnetic valve, so as to diagnose the presence or the absence of the fixation of the electromagnetic valve.

5 Claims, 7 Drawing Sheets

(56) References Cited

U.S. PATENT DOCUMENTS

| | | | |
|---|---|---|---|
| 7,925,408 B2* | 4/2011 | Shiraki | B60T 7/122 |
| | | | 701/70 |
| 9,671,032 B2* | 6/2017 | Castora | G05B 17/02 |
| 2002/0096939 A1* | 7/2002 | Sakata | B60T 8/441 |
| | | | 303/119.1 |
| 2006/0113836 A1* | 6/2006 | Nakamura | B60T 8/36 |
| | | | 303/122.04 |
| 2008/0071457 A1* | 3/2008 | Shiraki | B60T 7/122 |
| | | | 701/70 |
| 2016/0116077 A1* | 4/2016 | Castora | B60T 8/36 |
| | | | 700/282 |
| 2018/0056952 A1* | 3/2018 | Ono | B60T 8/1706 |
| 2020/0130665 A1* | 4/2020 | Reuter | B60T 8/4022 |

* cited by examiner

HYDRAULIC PRESSURE CONTROL UNIT

This application claims priority under 35 U.S.C. § 119 to patent application number JP 2018-097794 filed on May 22, 2018 in Japan, the disclosure of which is incorporated herein by reference in its entirety.

BACKGROUND OF THE INVENTION

1. Field of the Invention

The present disclosure relates to a hydraulic pressure control unit capable of appropriately diagnosing presence or absence of fixation of an electromagnetic valve.

2. Description of the Background Art

Conventionally, a vehicle behavior control system that uses a hydraulic pressure of a hydraulic fluid to control behavior of a vehicle such as a motorcycle has been available. In such a vehicle behavior control system, a hydraulic pressure control unit is used to control the hydraulic pressure generated by the hydraulic fluid. More specifically, the hydraulic pressure control unit operates an electromagnetic valve that is provided in a channel for the hydraulic fluid, so as to control the hydraulic pressure generated by the hydraulic fluid.

As a state of the electromagnetic valve, there is a state called fixation that disallows movement of an armature as a movable portion of the electromagnetic valve. When the electromagnetic valve is fixed, it is difficult to appropriately control the hydraulic pressure of the hydraulic fluid by the hydraulic pressure control unit. Thus, for example, in order to notify a driver of the fixation of the electromagnetic valve and urge the driver to repair the electromagnetic valve, it is necessary to diagnose presence or absence of the fixation of the electromagnetic valve. For example, in JP-A-5-58539, such a technique is disclosed that presence or absence of mechanical failure such as the fixation of the electromagnetic valve is diagnosed in a brake system on the basis of a current value of a current flowing through a coil of the electromagnetic valve.

SUMMARY OF THE INVENTION

However, it cannot be said that the conventional technique such as the technique disclosed in JP-A-5-58539 is sufficient for the appropriate diagnosis of the presence or the absence of the fixation of the electromagnetic valve. Thus, it is desired to further appropriately diagnose the presence or the absence of the fixation of the electromagnetic valve. For example, according to the technique disclosed in JP-A-5-58539, in a process in which the current value of the current flowing through the coil of the electromagnetic valve is increased at initiation of applying the current to the coil, the presence or the absence of the fixation of the electromagnetic valve is diagnosed on the basis of a degree of deviation of a detected value of the current value from a value that is set in advance as an assumed current value when the fixation of the electromagnetic valve does not occur. Meanwhile, regardless of the presence or the absence of the fixation of the electromagnetic valve, the current value of the current flowing through the coil of the electromagnetic valve possibly varies in accordance with a temperature of the hydraulic fluid and the like, for example. Thus, in the diagnosis method as described above, it may be difficult to appropriately diagnose the presence or the absence of the fixation of the electromagnetic valve.

The present invention has been made with the above-described problem as the background and therefore obtains a hydraulic pressure control unit capable of appropriately diagnosing presence or absence of fixation of an electromagnetic valve.

A hydraulic pressure control unit according to the present invention is a hydraulic pressure control unit used for a vehicle behavior control system, and includes: a hydraulic pressure control mechanism that includes a base body and components assembled in the base body and including an electromagnetic valve that controls a hydraulic pressure generated by a hydraulic fluid for the vehicle behavior control system; and a controller that includes a control section controlling operation of the components. The controller includes: an acquisition section that acquires a current value of a current flowing through a coil of the electromagnetic valve; and a diagnosis section that determines whether the current value has exhibited behavior of being temporarily reduced in a process in which the current value is increased at initiation of applying the current to the coil of the electromagnetic valve, so as to diagnose presence or absence of fixation of the electromagnetic valve.

In the hydraulic pressure control unit according to the present invention, the controller includes: the acquisition section that acquires the current value of the current flowing through the coil of the electromagnetic valve in the hydraulic pressure control mechanism; and the diagnosis section that determines whether the current value has exhibited the behavior of being temporarily reduced in the process in which the current value is increased at the initiation of applying the current to the coil of the electromagnetic valve, so as to diagnose the presence or the absence of the fixation of the electromagnetic valve. Accordingly, the presence or the absence of the fixation of the electromagnetic valve can be diagnosed without relying on a change in a parameter (for example, a temperature of a hydraulic fluid, or the like) that has an influence on the current value of the current flowing through the coil of the electromagnetic valve. Therefore, it is possible to further appropriately diagnose the presence or the absence of the fixation of the electromagnetic valve.

DETAILED DESCRIPTION OF THE INVENTION

Figure 1:
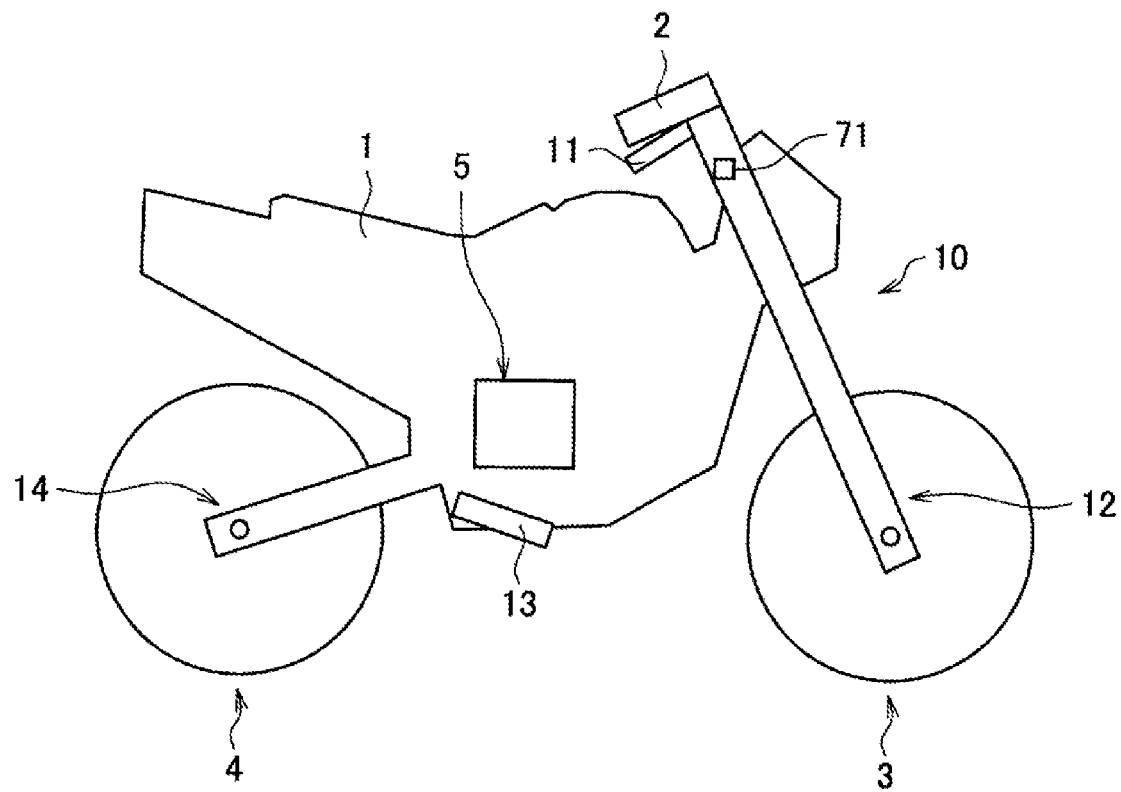
FIG. 1 is a schematic view of a configuration of a motorcycle on which a brake system according to an embodiment of the present invention is mounted.

A description will hereinafter be made on a hydraulic pressure control unit according to the present invention with reference to the drawings. Note that a description will hereinafter be made on a hydraulic pressure control unit that is used in a brake system for a two-wheeled motorcycle. However, the hydraulic pressure control unit according to the present invention may be used in a vehicle behavior control system (for example, a system that controls a damping force of a suspension, or the like) other than the brake system. For example, when the hydraulic pressure control unit according to the present invention is used in the system that controls the damping force of the suspension, it is possible to appropriately diagnose presence or absence of fixation of an electromagnetic valve that controls a hydraulic pressure to be generated by a hydraulic fluid in such a system. In addition, the hydraulic pressure control unit according to the present invention may be used in a vehicle behavior control system for a vehicle other than the two-wheeled motorcycle (for example, another straddle-type vehicle, such as an all-terrain vehicle, a three-wheeled motorcycle, or a bicycle, a four-wheeled vehicle, or the like). The straddle-type vehicle means a vehicle that a driver straddles. In addition, a description will hereinafter be made on a case where each of a front-wheel brake mechanism and a rear-wheel brake mechanism is provided in one unit; however, at least one of the front-wheel brake mechanism and the rear-wheel brake mechanism may be provided in multiple units. Alternatively, one of the front-wheel brake mechanism and the rear-wheel brake mechanism may not be provided.

A configuration, operation, and the like, which will be described below, constitute merely one example, and the hydraulic pressure control unit according to the present invention is not limited to a case with such a configuration, such operation, and the like.

The same or similar description will appropriately be simplified or will not be made below. In the drawings, the same or similar members or portions will not be denoted by a reference sign or will be denoted by the same reference sign. A detailed structure will appropriately be illustrated in a simplified manner or will not be illustrated.

<Configuration of Hydraulic Pressure Control Unit>

A description will herein be made on a configuration of a hydraulic pressure control unit 5 according to the embodiment of the present invention with reference to FIG. 1 to FIG. 5.

The hydraulic pressure control unit 5 controls a braking force to brake each wheel of a motorcycle 100. In this embodiment, the hydraulic pressure control unit 5 is used in a brake system 10 for the motorcycle 100. The brake system 10 corresponds to an example of the vehicle behavior control system according to the present invention, and is a system that uses a hydraulic pressure of a brake fluid as the hydraulic fluid to control behavior of the motorcycle 100 by the braking force.

Figure 2:
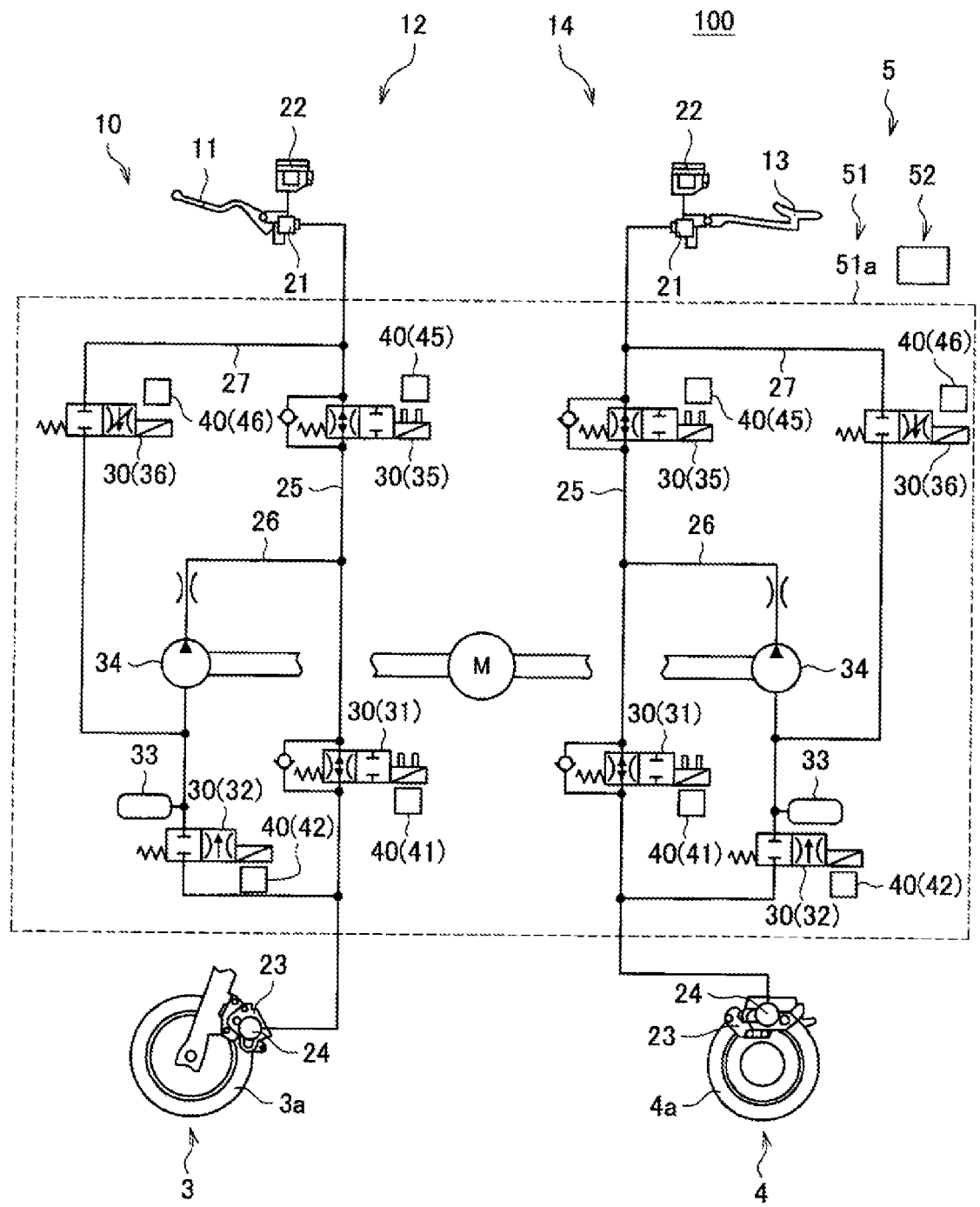
FIG. 2 is a schematic diagram of a configuration of the brake system according to the embodiment of the present invention.

FIG. 1 is a schematic view of a configuration of the motorcycle 100 on which the brake system 10 including the hydraulic pressure control unit 5 is mounted. FIG. 2 is a schematic diagram of a configuration of the brake system 10.

As illustrated in FIG. 1 and FIG. 2, the brake system 10 is mounted on the motorcycle 100. The motorcycle 100 includes: a trunk 1; a handlebar 2 that is held by the trunk 1 in a freely turnable manner; a front wheel 3 that is held by the trunk 1 in the freely turnable manner with the handlebar 2; and a rear wheel 4 that is held by the trunk 1 in a freely rotatable manner. The motorcycle 100 also includes a display device 71 that is a device visually showing information. The display device 71 corresponds to an example of a notification device that notifies a driver of the information. For example, a display or a lamp is used as the display device 71.

The brake system 10 includes: a first brake operation section 11; a front-wheel brake mechanism 12 that brakes the front wheel 3 in an interlocking manner with at least the first brake operation section 11; a second brake operation section 13; and a rear-wheel brake mechanism 14 that brakes the rear wheel 4 in the interlocking manner with at least the second brake operation section 13. The brake system 10 also includes the hydraulic pressure control unit 5, and a part of the front-wheel brake mechanism 12 and a part of the rear-wheel brake mechanism 14 are included in the hydraulic pressure control unit 5. The hydraulic pressure control unit 5 is a unit that has a function of controlling the braking force to be applied to the front wheel 3 by the front-wheel brake mechanism 12 and the braking force to be applied to the rear wheel 4 by the rear-wheel brake mechanism 14.

The first brake operation section 11 is provided on the handlebar 2 and is operated by the driver's hand. The first brake operation section 11 is a brake lever, for example. The second brake operation section 13 is provided in a lower portion of the trunk 1 and is operated by the driver's foot. The second brake operation section 13 is a brake pedal, for example.

Each of the front-wheel brake mechanism 12 and the rear-wheel brake mechanism 14 includes: a master cylinder 21 in which a piston (not illustrated) is installed; a reservoir 22 that is attached to the master cylinder 21; a brake caliper 23 that is held by the trunk 1 and has a brake pad (not illustrated); a wheel cylinder 24 that is provided in the brake caliper 23; a primary channel 25 through which a brake fluid in the master cylinder 21 is delivered to the wheel cylinder 24; a secondary channel 26 through which the brake fluid in the wheel cylinder 24 is released; and a supply channel 27 through which the brake fluid in the master cylinder 21 is supplied to the secondary channel 26.

An inlet valve (EV) 31 is provided in the primary channel 25. The secondary channel 26 bypasses a portion of the primary channel 25 between the wheel cylinder 24 side and the master cylinder 21 side from the inlet valve 31. The secondary channel 26 is sequentially provided with an outlet valve (AV) 32, an accumulator 33, and a pump 34 from an upstream side. Between an end of the primary channel 25 on the master cylinder 21 side and a portion thereof to which a downstream end of the secondary channel 26 is connected, a first valve (USV) 35 is provided. The supply channel 27 communicates between the master cylinder 21 and a suction side of the pump 34 in the secondary channel 26. A second valve (HSV) 36 is provided in the supply channel 27.

The inlet valve 31 is an electromagnetic valve that is opened in an unenergized state and closed in an energized state, for example. The outlet valve 32 is an electromagnetic valve that is closed in an unenergized state and opened in an energized state, for example. The first valve 35 is an electromagnetic valve that is opened in an unenergized state and is closed in an energized state, for example. The second valve 36 is an electromagnetic valve that is closed in an unenergized state and is opened in an energized state, for example. As will be described below, each of the inlet valve 31, the outlet valve 32, the first valve 35, and the second valve 36 corresponds to an example of an electromagnetic valve 30 in the hydraulic pressure control unit 5.

The hydraulic pressure control unit 5 includes: a hydraulic pressure control mechanism 51 that includes the part of the front-wheel brake mechanism 12 and the part of the rear-wheel brake mechanism 14 described above; and a controller (ECU) 52 that controls operation of the hydraulic pressure control mechanism 51.

More specifically, the hydraulic pressure control mechanism 51 of the hydraulic pressure control unit 5 includes: a base body 51a; and components including the electromagnetic valves 30, each of which is assembled in the base body 51a to control the hydraulic pressure generated by the brake fluid in the brake system 10.

For example, the base body 51a has a substantially rectangular-parallelepiped shape and is formed of a metallic material. In the base body 51a of the hydraulic pressure control mechanism 51, the primary channels 25, the secondary channels 26, and the supply channels 27 are formed, and the electromagnetic valves 30 (more specifically, the inlet valves 31, the outlet valves 32, the first valves 35, and the second valves 36), the accumulators 33, and the pumps 34 are assembled as the components, each of which controls the hydraulic pressure generated by the brake fluid in the brake system 10, in the base body 51a. Operation of each of these components is controlled by the controller 52 in the hydraulic pressure control unit 5 as will be described later. The base body 51a may be formed of one member or may be formed of multiple members. In the case where the base body 51a is formed of multiple members, the components may separately be provided in the multiple members.

A description will hereinafter be made on a detailed description of the electromagnetic valve 30 such as the inlet valve 31 with reference to FIG. 3.

Figure 3:
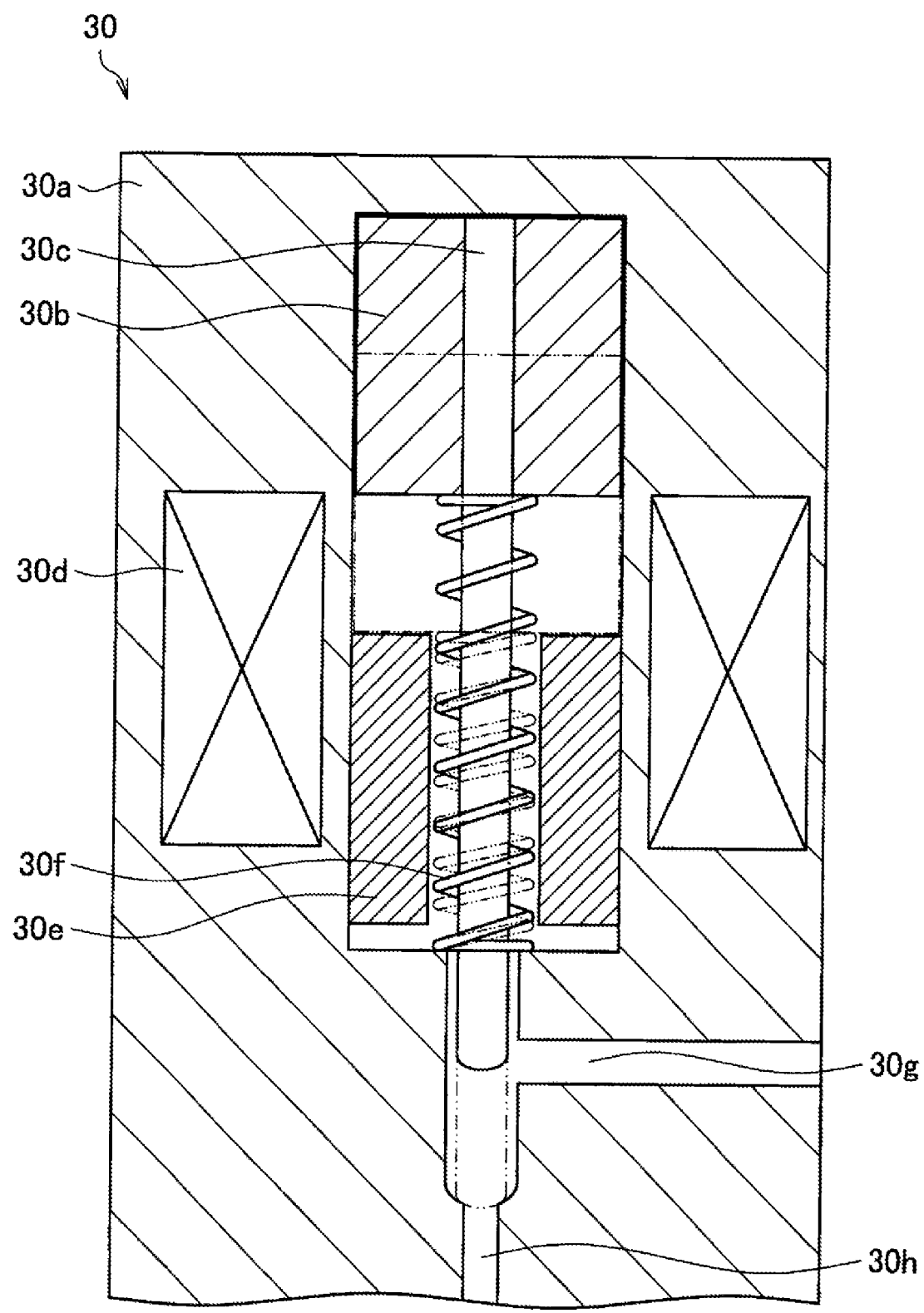
FIG. 3 is a schematic cross-sectional view of an example of an electromagnetic valve in a hydraulic pressure control unit according to the embodiment of the present invention.

FIG. 3 is a schematic cross-sectional view of an example of the electromagnetic valve 30 in the hydraulic pressure control unit 5. More specifically, of the electromagnetic valves 30 provided in the hydraulic pressure control unit 5, the electromagnetic valve 30 exemplified in FIG. 3 is the electromagnetic valve 30 that is opened in the unenergized state and closed in the energized state.

As illustrated in FIG. 3, the electromagnetic valve 30 in the hydraulic pressure control unit 5 includes a case 30a, an armature 30b, a tappet 30c, a coil 30d, a core 30e, a spring 30f, a first channel 30g, and a second channel 30h, for example.

The armature 30b corresponds to a movable portion capable of reciprocating relative to the case 30a in the case 30a. For example, the armature 30b has a substantially cylindrical shape, is arranged in an internal space provided in the case 30a, and can reciprocate along an axial direction of the armature 30b. The tappet 30c is fixed to the armature 30b and can integrally move with the armature 30b. For example, the tappet 30c is a solid rod member that has a circular cross-sectional shape, and is fitted and fixed to an inner circumferential section of the armature 30b.

The coil 30d is fixed to the case 30a and generates a magnetic field by using supplied power. For example, the coil 30d is provided in a manner to surround the internal space of the case 30a along a circumferential direction of the armature 30b. The core 30e is an iron core that is magnetized by the magnetic field generated by the coil 30d, and has a substantially cylindrical shape, for example. In the internal space of the case 30a, the core 30e is coaxially arranged with the armature 30b, and the tappet 30c is inserted through an inner circumferential section of the core 30e. When the core 30e is magnetized, a magnetic force in a direction to approach the core 30e acts on the armature 30b.

The spring 30f urges the armature 30b in a direction away from the core 30e. For example, in the internal space of the case 30a, the spring 30f is provided in a manner to be held between an inner circumferential section of the case 30a and an end surface of the armature 30b on the core 30e side.

The first channel 30g and the second channel 30h are formed in the case 30a and each form a part of the primary channel 25, the second channel 26, or the supply channel 27 provided with the electromagnetic valve 30. In the case 30a, the first channel 30g and the second channel 30h are mutually connected via a space where a tip of the tappet 30c is accommodated.

In a state where a current is not applied to the coil 30d (that is, in the unenergized state), as indicated by a solid line in FIG. 3, the armature 30b is held at a separated position from the core 30e by an urging force of the spring 30f. In this way, the first channel 30g and the second channel 30h are brought into a mutually communicating state (that is, a state where the electromagnetic valve 30 is opened).

Meanwhile, in a state where the current is applied to the coil 30d (that is, in the energized state), as indicated by a two-dot chain line in FIG. 3, the armature 30b is attracted to and held on the core 30e side with the tappet 30c by the magnetic force generated in the magnetized core 30e. In this way, an opening at an end of the second channel 30h is closed by the tip of the tappet 30c. As a result, the first channel 30g and the second channel 30h are brought into a mutually blocked state (that is, a state where the electromagnetic valve 30 is closed).

Here, the hydraulic pressure control unit 5 is provided with a current sensor 40 that detects a current value of a current flowing through the coil 30d of the electromagnetic valve 30. Note that the current sensor 40 may detect another physical quantity that can substantially be converted into the current value of the current flowing through the coil 30d of the electromagnetic valve 30. For example, as illustrated in FIG. 2, the current sensor 40 is provided for each of the electromagnetic valves 30. A detection result of each of the current sensors 40 is output to the controller 52 and used for processing executed by the controller 52.

More specifically, as the current sensors 40, an inlet valve current sensor 41, an outlet valve current sensor 42, a first valve current sensor 45, and a second valve current sensor 46 are respectively provided for the inlet valve 31, the outlet valve 32, the first valve 35, and the second valve 36. Just as described, each of the inlet valve current sensor 41, the outlet valve current sensor 42, the first valve current sensor 45, and the second valve current sensor 46 corresponds to an example of the current sensor 40 in the hydraulic pressure control unit 5.

A description will hereinafter be made on a detailed description of the current sensor 40 such as the inlet valve current sensor 41 with reference to FIG. 4.

Figure 4:
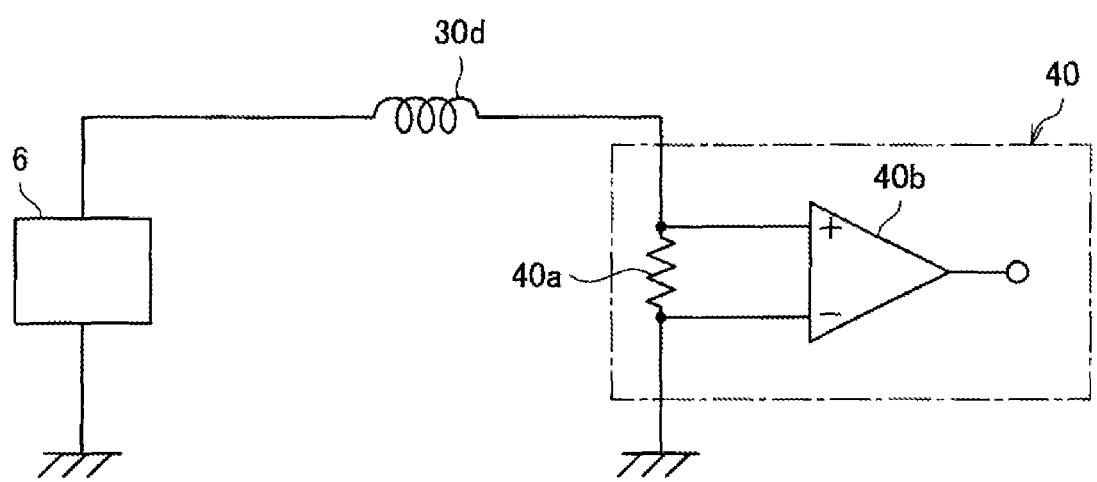
FIG. 4 is a schematic diagram of an example of a current sensor in the hydraulic pressure control unit according to the embodiment of the present invention.

FIG. 4 is a schematic diagram of an example of the current sensor 40 in the hydraulic pressure control unit 5.

As illustrated in FIG. 4, the current sensor 40 in the hydraulic pressure control unit 5 includes a shunt resistor 40a and an operational amplifier 40b, for example.

The shunt resistor 40a is connected in series to the coil 30d, which is connected to a power supply 6, in the electromagnetic valve 30. The power is supplied to the coil 30d of the electromagnetic valve 30 from the power supply 6 such as a secondary battery. The operational amplifier 40b, which is connected in parallel to the shunt resistor 40a, differentially amplifies and outputs a voltage generated between both ends of the shunt resistor 40a. The current sensor 40 detects the current value of the current flowing through the coil 30d of the electromagnetic valve 30 on the basis of a resistance value of the shunt resistor 40a and an output value of the operational amplifier 40b, just as described.

More specifically, the controller 52 of the hydraulic pressure control unit 5 controls the operation of each of the above-described components that are assembled in the base body 51a of the hydraulic pressure control mechanism 51.

For example, the controller 52 is partially or entirely constructed of a microcomputer, a microprocessor unit, or the like. In addition, the controller 52 may partially or entirely be constructed of a member in which firmware or the like can be updated, or may partially or entirely be a program module or the like that is executed by a command from a CPU or the like, for example. The controller 52 may be provided as one unit or may be divided into multiple units, for example. Furthermore, the controller 52 may be attached to the base body 51a or may be attached to a member other than the base body 51a.

Figure 5:
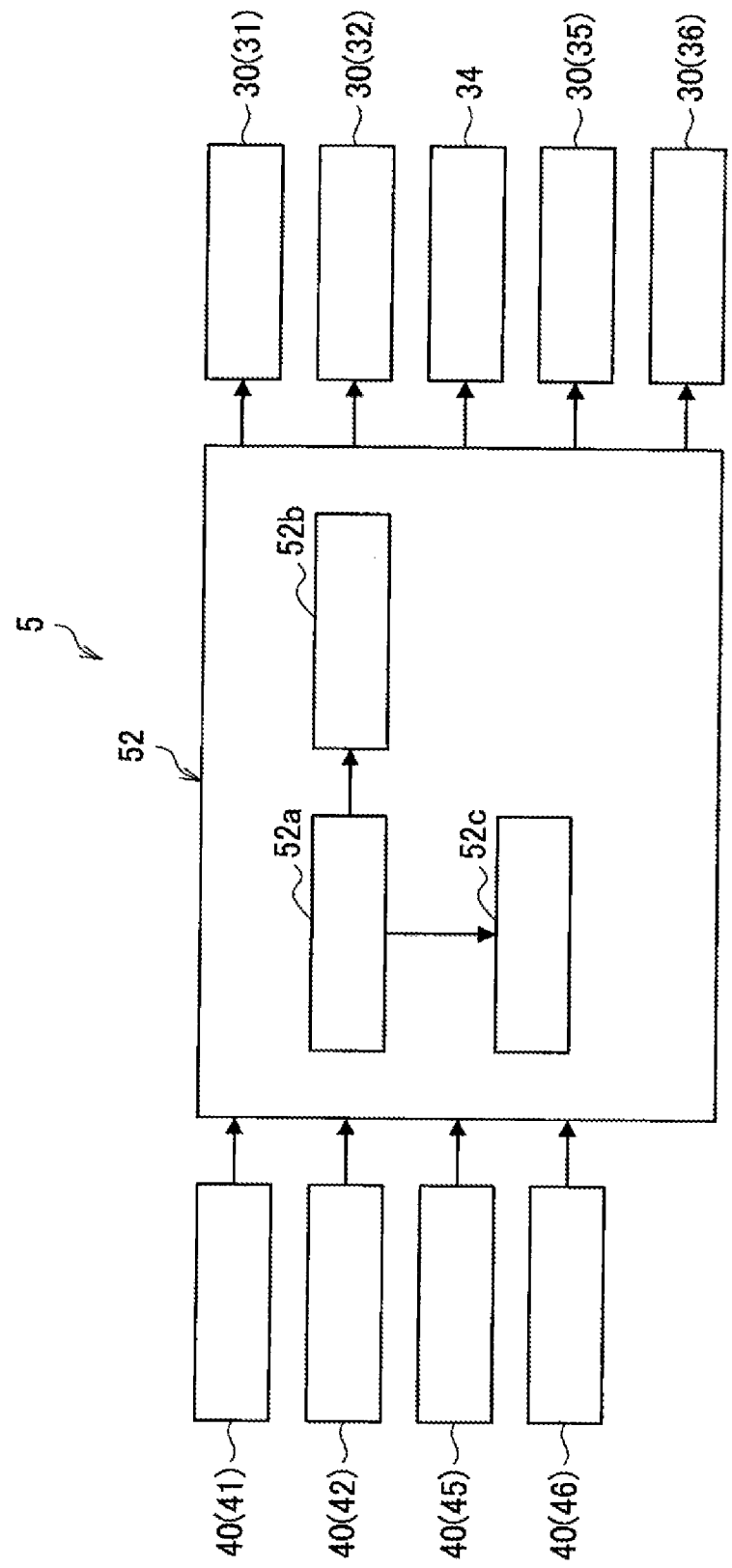
FIG. 5 is a block diagram of an exemplary functional configuration of a controller in the hydraulic pressure control unit according to the embodiment of the present invention.

FIG. 5 is a block diagram of an exemplary functional configuration of the controller 52 in the hydraulic pressure control unit 5.

As illustrated in FIG. 5, the controller 52 includes an acquisition section 52a, a control section 52b, and a diagnosis section 52c, for example.

The acquisition section 52a acquires the information that is output from each of the sensors, a different controller from the controller 52, or the like, and outputs the acquired information to the control section 52b and the diagnosis section 52c. For example, the acquisition section 52a acquires the information on a travel state of the motorcycle 100, and outputs the information to the control section 52b. In addition, for example, the acquisition section 52a acquires the current value of the current flowing through the coil 30d of the electromagnetic valve 30 from the current sensor 40, and outputs the current value to the diagnosis section 52c.

The control section 52b controls the operation of each of the above-described components that are assembled in the base body 51a of the hydraulic pressure control mechanism 51. In this way, the control section 52b can control the braking force to be applied to the front wheel 3 by the front-wheel brake mechanism 12 and the braking force to be applied to the rear wheel 4 by the rear-wheel brake mechanism 14. The control section 52b controls the operation of each of the above components in accordance with the travel state of the motorcycle 100, for example.

For example, in a normal state, that is, in a state where ABS operation, automatic braking operation, or the like, which will be described below, is not executed, the control section 52b opens the inlet valve 31, closes the outlet valve 32, opens the first valve 35, and closes the second valve 36. When the first brake operation section 11 is operated in such a state, in the front-wheel brake mechanism 12, the piston (not illustrated) in the master cylinder 21 is pressed to increase the hydraulic pressure of the brake fluid in the wheel cylinder 24, the brake pad (not illustrated) of the brake caliper 23 is then pressed against a rotor 3a of the front wheel 3, and the braking force is thereby applied to the front wheel 3. Meanwhile, when the second brake operation section 13 is operated, in the rear-wheel brake mechanism 14, the piston (not illustrated) in the master cylinder 21 is pressed to increase the hydraulic pressure of the brake fluid in the wheel cylinder 24, the brake pad (not illustrated) of the brake caliper 23 is then pressed against a rotor 4a of the rear wheel 4, and the braking force is thereby applied to the rear wheel 4.

The ABS operation is operation that is executed when the wheel (more specifically, the front wheel 3 or the rear wheel 4) is locked or possibly locked and that reduces the braking force applied to the wheel without relying on an operation of the brake operation section (more specifically, the first brake operation section 11 or the second brake operation section 13) by the driver, for example. For example, in a state where the ABS operation is executed, the control section 52b closes the inlet valve 31, opens the outlet valve 32, opens the first valve 35, and closes the second valve 36. When the pump 34 is driven by the controller 52 in such a state, the hydraulic pressure of the brake fluid in the wheel cylinder 24 is reduced, and the braking force that is applied to the wheel is thereby reduced.

The automatic braking operation is operation that is executed when it becomes necessary to stabilize posture of the motorcycle 100 during turning of the motorcycle 100 or the like and that causes the generation of the braking force to be applied to the wheel (more specifically, the front wheel 3 or the rear wheel 4) without relying on the operation of the brake operation section (more specifically, the first brake operation section 11 or the second brake operation section 13) by the driver, for example. For example, in a state where the automatic braking operation is executed, the control section 52b opens the inlet valve 31, closes the outlet valve 32, closes the first valve 35, and opens the second valve 36. When the pump 34 is driven by the controller 52 in such a state, the hydraulic pressure of the brake fluid in the wheel cylinder 24 is increased, and the braking force that is applied to the wheel is thereby generated.

The diagnosis section 52c diagnoses presence or absence of fixation of the electromagnetic valve 30 on the basis of the current value of the current flowing through the coil 30d of the electromagnetic valve 30. The fixation of the electromagnetic valve 30 means a state where the armature 30b as the movable portion of the electromagnetic valve 30 cannot move. Such fixation of the electromagnetic valve 30 possibly occurs, for example, when a gas component of the brake fluid is evaporated in conjunction with a temperature increase of the brake fluid in the brake system 10 to a high temperature, when the brake fluid absorbs moisture, when a preservative in the brake fluid induces a chemical reaction, or the like.

More specifically, in a process in which the current value of the current flowing through the coil 30d of the electromagnetic valve 30 is increased at initiation of applying the current to the coil 30d, the diagnosis section 52c determines whether the current value has exhibited behavior of being temporarily reduced, and thereby diagnoses the presence or the absence of the fixation of the electromagnetic valve 30.

In this embodiment, the controller 52 executes processing related to the diagnosis of the fixation of the electromagnetic valve 30 (processing primarily executed by the diagnosis section 52c), so as to appropriately diagnose the presence or the absence of the fixation of the electromagnetic valve 30. The processing related to the diagnosis of the fixation of the electromagnetic valve 30, just as described, will be described later in detail.

<Operation of Hydraulic Pressure Control Unit>

Figure 6:
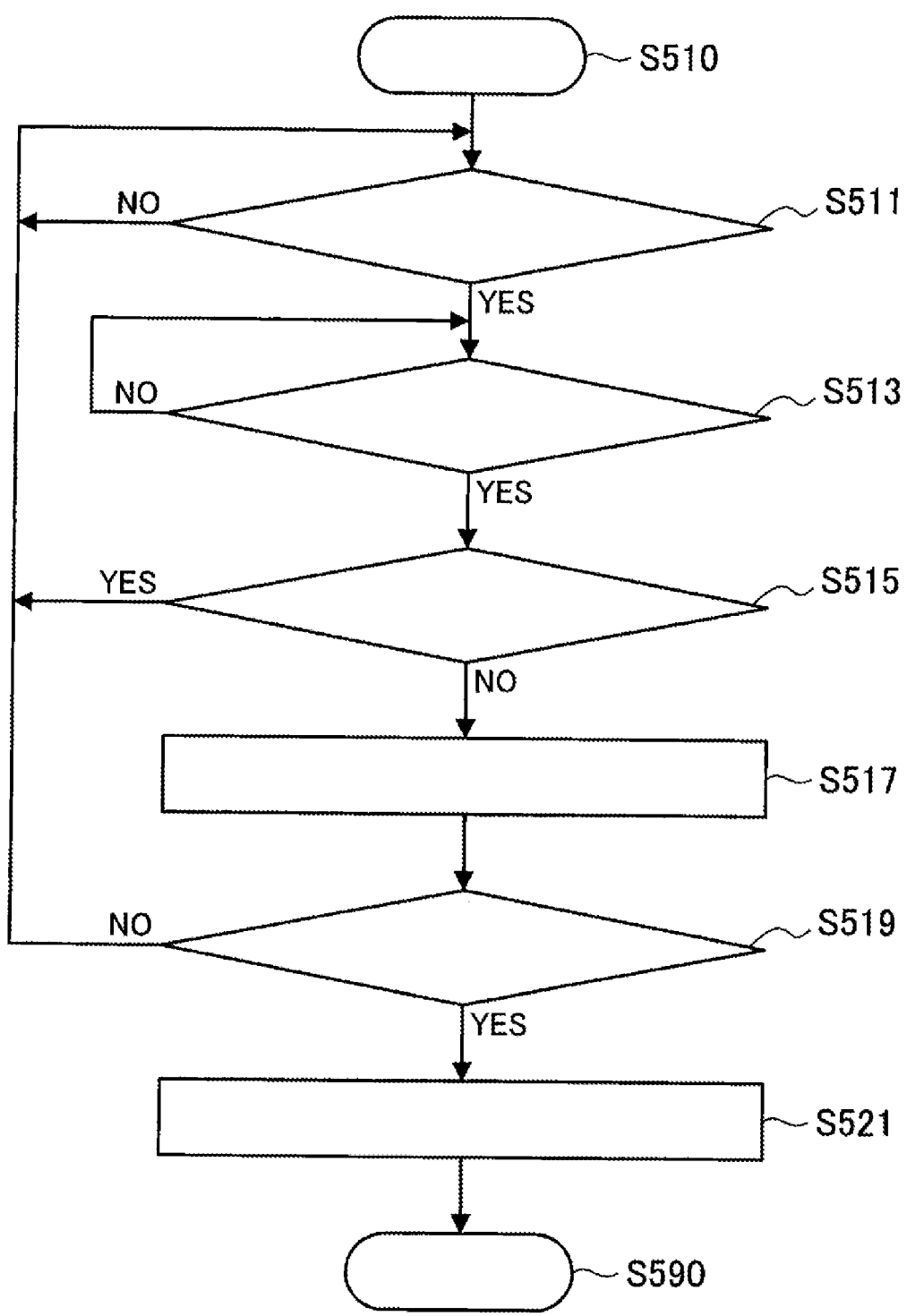
FIG. 6 is a flowchart of an example of a processing procedure that is executed by the controller in the hydraulic pressure control unit according to the embodiment of the present invention.
Figure 7:
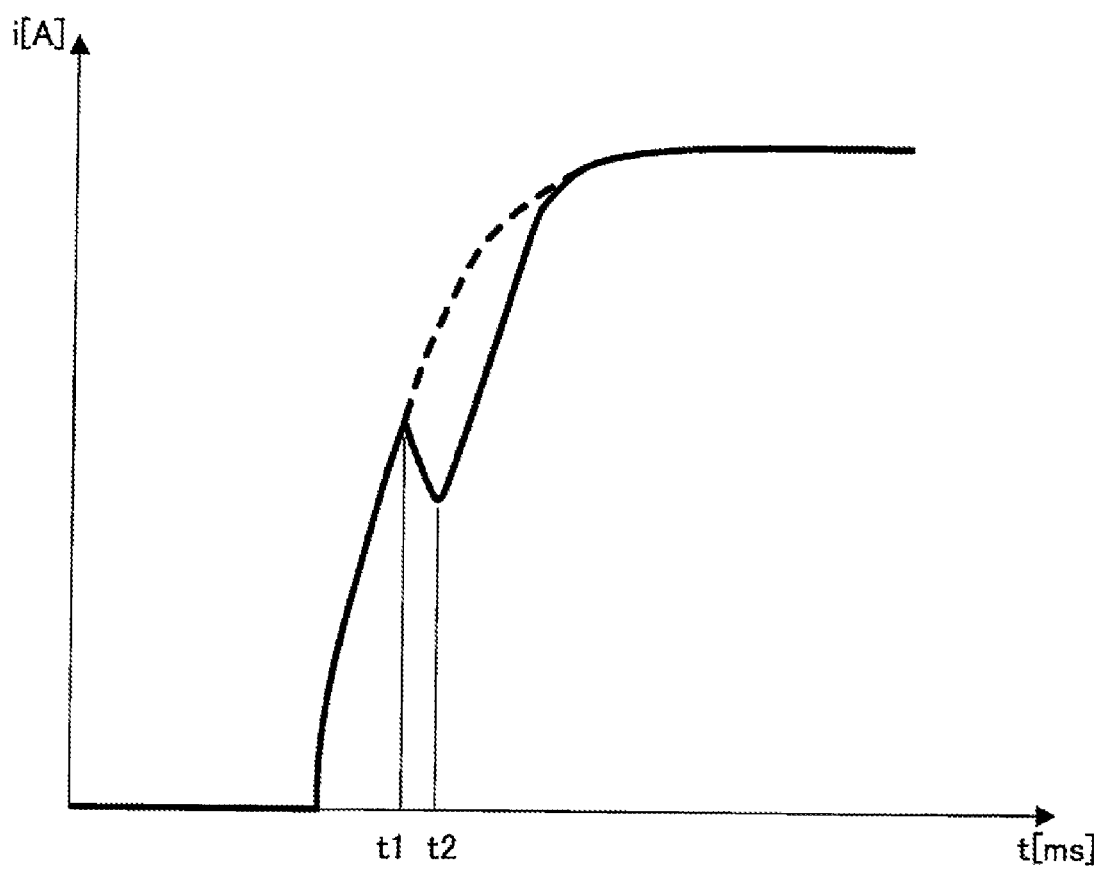
FIG. 7 is a schematic graph of an exemplary transition of a current value of a current flowing through a coil of the electromagnetic valve in the hydraulic pressure control unit according to the embodiment of the present invention at initiation of applying the current to the coil.

A description will herein be made on operation of the hydraulic pressure control unit 5 according to the embodiment of the present invention with reference to FIG. 6 and FIG. 7.

FIG. 6 is a flowchart of an example of a processing procedure that is executed by the controller 52 in the hydraulic pressure control unit 5. More specifically, a control flow illustrated in FIG. 6 corresponds to a processing flow that is related to the diagnosis of the fixation of the electromagnetic valve 30 among processing executed by the controller 52, and is executed for the electromagnetic valves 30 in parallel. In addition, the control flow illustrated in FIG. 6 is initiated after the brake system 10 is activated (in other words, after the motorcycle 100 starts driving), for example. Step S510 and step S590 in FIG. 6 respectively correspond to initiation and termination of the control flow.

When the control flow illustrated in FIG. 6 is initiated, in step S511, the diagnosis section 52c determines whether the current starts being applied to the coil 30d of the electromagnetic valve 30. If it is determined that the current starts being applied to the coil 30d of the electromagnetic valve 30 (step S511/YES), the processing proceeds to step S513. On the other hand, if it is determined that the current does not start being applied to the coil 30d of the electromagnetic valve 30 (step S511/NO), the determination processing in step S511 is repeated.

For example, the diagnosis section 52c determines whether the current starts being applied to the coil 30d of the electromagnetic valve 30 on the basis of the detection value of the current sensor 40. More specifically, when the current starts being applied to the coil 30d of the electromagnetic valve 30, the current value of the current flowing through the coil 30d starts being increased toward a target current value. More specifically, the target current value is set to a current value with which the armature 30b can appropriately be held at a position that corresponds to the closed state of the electromagnetic valve 30. Thus, the diagnosis section 52c can determine whether the current starts being applied to the coil 30d on the basis of behavior of the current value of the current flowing through the coil 30d of the electromagnetic valve 30.

In the present specification, time at which the current starts being applied to the coil 30d of the electromagnetic valve 30 specifically means a period until the current value reaches the target current value after the current value of the current flowing through the coil 30d starts being increased in conjunction with the application of the current to the coil 30d.

In step S513, the diagnosis section 52c determines whether the increase in the current value of the current flowing through the coil 30d of the electromagnetic valve 30 is finished. If it is determined that the increase in the current value of the current flowing through the coil 30d of the electromagnetic valve 30 is finished (step S513/YES), the processing proceeds to step S515. On the other hand, if it is determined that the increase in the current value of the current flowing through the coil 30d of the electromagnetic valve 30 is not finished (step S513/NO), the determination processing in step S513 is repeated.

For example, the diagnosis section 52c determines whether the increase in the current value of the current flowing through the coil 30d of the electromagnetic valve 30 is finished on the basis of the detection value of the current sensor 40. More specifically, the current value of the current flowing through the coil 30d of the electromagnetic valve 30 is maintained at the target current value after being increased and reaching the target current value due to the application of the current to the coil 30d. Thus, the diagnosis section 52c can determine whether the increase in the current value of the current flowing through the coil 30d is finished on the basis of the behavior of the current value of the current flowing through the coil 30d of the electromagnetic valve 30.

In step S515, the diagnosis section 52c determines whether behavior of the power supply 6, which supplies the power to the coil 30d of the electromagnetic valve 30, has been abnormal in a process in which the current value of the current flowing through the coil 30d of the electromagnetic valve 30 is increased. If it is determined that the behavior of the power supply 6 has been abnormal (step S515/YES), the processing returns to step S511. On the other hand, if it is determined that the behavior of the power supply 6 has been normal (step S515/NO), the processing proceeds to step S517.

For example, the motorcycle 100 is provided with a sensor (not illustrated) that detects a state amount such as a voltage value of the power supply 6. The diagnosis section 52c determines whether the behavior of the power supply 6 has been abnormal (for example, whether the voltage value of the power supply 6 has been excessively unstable) on the basis of a detection result that is output from the sensor to the controller 52. Note that, in the case where the different controller from the controller 52 outputs information indicative of whether the behavior of the power supply 6 has been abnormal to the controller 52, the diagnosis section 52c may determine whether the behavior of the power supply 6 has been abnormal on the basis of such information output from the other controller.

In step S517, the diagnosis section 52c determines the presence or the absence of the fixation of the electromagnetic valve 30.

More specifically, in the process in which the current value of the current flowing through the coil 30d of the electromagnetic valve 30 is increased at the initiation of applying the current to the coil 30d, the diagnosis section 52c determines whether the current value has exhibited the behavior of being temporarily reduced, and thereby diagnoses the presence or the absence of the fixation of the electromagnetic valve 30. At this time, if it is determined that the current value of the current flowing through the coil 30d has exhibited the behavior of being temporarily reduced, the diagnosis section 52c diagnoses that the fixation of the electromagnetic valve 30 does not occur.

FIG. 7 is a schematic graph of an exemplary transition of the current value of the current flowing through the coil 30d of the electromagnetic valve 30 in the hydraulic pressure control unit 5 at the initiation of applying the current to the coil 30d. More specifically, in FIG. 7, the transition of the current value of the current flowing through the coil 30d at the time when the fixation of the electromagnetic valve 30 does not occur is indicated by a solid line, and the transition of the current value of the current flowing through the coil 30d at the time when the fixation of the electromagnetic valve 30 occurs is indicated by a broken line. In addition, in FIG. 7, a horizontal axis represents time t [ms], and a vertical axis represents a current value i [A].

In the case where the fixation of the electromagnetic valve 30 does not occur, in the electromagnetic valve 30, the core 30e is magnetized in conjunction with the application of the current to the coil 30d. In this way, the magnetic force in the direction to approach the core 30e acts on the armature 30b, and the armature 30b is attracted and moves to the core 30e side with the tappet 30c. At this time, in the magnetic field generated by the coil 30*d*, the armature 30*b* moves relative to the magnetic field. As a result, a counter-electromotive force is generated in the coil 30*d* in a manner to weaken magnetic flux generated by the coil 30*d*. Thus, as indicated by the solid line in FIG. 7, in the process in which the current flowing through the coil 30*d* is increased, the current value exhibits the behavior of being temporarily reduced. For example, FIG. 7 illustrates a situation where the current value of the current flowing through the coil 30*d* starts being reduced at time t1 and the reduction of the current value is terminated at time t2.

Meanwhile, in the case where the fixation of the electromagnetic valve 30 occurs, in the electromagnetic valve 30, the core 30*e* is magnetized in conjunction with the application of the current to the coil 30*d*. In this way, although the magnetic force in the direction to approach the core 30*e* acts on the armature 30*b*, the armature 30*b* does not move to the core 30*e* side. As a result, the counter-electromotive force, which is associated with the movement of the armature 30*b*, is not generated in the coil 30*d*. Thus, as indicated by the broken line in FIG. 7, in the process in which the current flowing through the coil 30*d* is increased, the current value does not exhibit the behavior of being temporarily reduced.

As described above, in the process in which the current value of the current flowing through the coil 30*d* is increased, the current value exhibits the behavior of being temporarily reduced in the case where the fixation of the electromagnetic valve 30 does not occur, and the current value does not exhibit the behavior of being temporarily reduced in the case where the fixation of the electromagnetic valve 30 occurs. Thus, in the process in which the current value of the current flowing through the coil 30*d* is increased, it is determined whether the current value has exhibited the behavior of being temporarily reduced. In this way, the presence or the absence of the fixation of the electromagnetic valve 30 can be diagnosed.

From a perspective of appropriately diagnosing the presence or the absence of the fixation of the electromagnetic valve 30, for example, in the case where a reduced amount of the current value is greater than a reference value at the time when the current value of the current flowing through the coil 30*d* is continuously reduced, the diagnosis section 52*c* preferably determines that the current value has exhibited the behavior of being temporarily reduced, and preferably diagnoses that the fixation of the electromagnetic valve 30 does not occur. The above reference value is appropriately set to a value with which it is possible to appropriately determine whether the counter-electromotive force is generated in the coil 30*d* due to the movement of the armature 30*b*. The above reference value is set on the basis of a specification of the electromagnetic valve 30 and a specification of the brake fluid in the brake system 10, for example.

Note that the diagnosis section 52*c* may use a reduced amount of the current value of the current flowing through the coil 30*d* per unit time as the above reduced amount, so as to determine whether the current value has exhibited the behavior of being temporarily reduced. Alternatively, the diagnosis section 52*c* may use the reduced amount of the current value in a period from time at which the current value of the current flowing through the coil 30*d* starts being reduced to time at which the reduction of the current value is terminated, so as to determine whether the current value has exhibited the behavior of being temporarily reduced.

Here, from a perspective of further appropriately diagnosing the presence or the absence of the fixation of the electromagnetic valve 30, the diagnosis section 52*c* may vary the above reference value in accordance with a temperature.

For example, the diagnosis section 52*c* varies the above reference value in accordance with a temperature of the brake fluid in the brake system 10. In such a case, for example, the motorcycle 100 is provided with a sensor (not illustrated) that detects the temperature of the brake fluid in the brake system 10. The diagnosis section 52*c* varies the above reference value on the basis of a detection result that is output from the sensor to the controller 52. More specifically, the diagnosis section 52*c* increases the reference value as the temperature of the brake fluid in the brake system 10 is increased. As the temperature of the brake fluid is increased, viscosity of the brake fluid is reduced, and thus a moving speed of the armature 30*b* tends to be increased. As a result, the counter-electromotive force, which is generated in the coil 30*d* in conjunction with the movement of the armature 30*b*, tends to be increased. Thus, the reference value is increased as the temperature of the brake fluid is increased. In this way, it is possible to further appropriately diagnose the presence or the absence of the fixation of the electromagnetic valve 30.

Note that the diagnosis section 52*c* may vary the above reference value in accordance with another physical quantity (for example, a temperature of the electromagnetic valve 30, or the like) that can substantially be converted to the temperature of the brake fluid in the brake system 10. In such a case, for example, the motorcycle 100 is provided with a sensor (not illustrated) detecting the other physical quantity that can substantially be converted to the temperature of the brake fluid in the brake system 10. The diagnosis section 52*c* varies the above reference value on the basis of a detection result that is output from the sensor to the controller 52.

Next, in step S519, the diagnosis section 52*c* determines whether such a diagnosis that the fixation of the electromagnetic valve 30 occurs has been made. If it is determined that such a diagnosis that the fixation of the electromagnetic valve 30 occurs has been made (step S519/YES), the processing proceeds to step S521. If it is determined that such a diagnosis that the fixation of the electromagnetic valve 30 occurs has not been made (step S519/NO), the processing returns to step S511.

In step S521, the controller 52 outputs an operation command to make the notification device notify the driver of a diagnosis result (more specifically, the diagnosis result indicating that it is diagnosed the fixation of the electromagnetic valve 30 occurs).

For example, in the case where it is diagnosed that the fixation of the electromagnetic valve 30 occurs, the controller 52 outputs an operation command to the display device 71 so as to make the display device 71 display the diagnosis result indicating that the occurrence of the fixation of the electromagnetic valve 30 is diagnosed. Then, the controller 52 makes the display device 71 display the diagnosis result. Note that, as the notification device, a different device (for example, a device that outputs sound, or the like) from the display device 71 may be used.

Next, the control flow illustrated in FIG. 6 is terminated.

As described above, in the control flow illustrated in FIG. 6, in the case where it is determined YES in step S515, the processing does not proceed to step S517 and returns to step S511. That is, in the case where it is determined that the behavior of the power supply 6 has been abnormal in the process in which the current value of the current flowing through the coil 30*d* of the electromagnetic valve 30 is increased at the initiation of applying the current to the coil 30d, the fixation of the electromagnetic valve 30 is not diagnosed. The fixation of the electromagnetic valve 30 is diagnosed at the initiation of applying the current to the coil 30d in the next flow or onward. From the perspective of further appropriately diagnosing the presence or the absence of the fixation of the electromagnetic valve 30, as described above, in the case where it is determined that the behavior of the power supply 6, which supplies the power to the coil 30d of the electromagnetic valve 30, has been abnormal in the process in which the current value of the current flowing through the coil 30d of the electromagnetic valve 30 is increased at the initiation of applying the current to the coil 30d, it is preferred that the diagnosis section 52c does not validate the diagnosis result of the fixation of the electromagnetic valve 30.

Note that step S515 may be executed after step S517 or step S519. In such a case, if it is determined YES in step S515, the processing does not proceed to step S521 but returns to step S511. That is, in the case where it is determined that the behavior of the power supply 6, which supplies the power to the coil 30d of the electromagnetic valve 30, has been abnormal in the process in which the current value of the current flowing through the coil 30d is increased, the diagnosis result of the fixation of the electromagnetic valve 30 is not validated, and the diagnosis of the fixation of the electromagnetic valve 30 is made again.

The above description has been made on the example in which the diagnosis section 52c diagnoses the presence or the absence of the fixation of the electromagnetic valve 30 in the process in which the current value of the current flowing through the coil 30d of the electromagnetic valve 30 at the initiation of applying the current to the coil 30d. However, in addition to such processing, the diagnosis section 52c may also diagnose the presence or the absence of the fixation of the electromagnetic valve 30 in a process in which the current value of the current flowing through the coil 30d of the electromagnetic valve 30 at the termination of applying the current to the coil 30d. For example, at the termination of applying the current to the coil 30d of the electromagnetic valve 30, the current value of the current flowing through the coil 30d is reduced from the target current value. Thus, the diagnosis section 52c may determine whether the current value has exhibited the behavior of being temporarily increased in the process in which the current value of the current flowing through the coil 30d is reduced. In this way, the diagnosis section 52c may diagnose the presence or the absence of the fixation of the electromagnetic valve 30. At this time, in the case where it is determined that the current value of the current flowing through the coil 30d has exhibited the behavior of being temporarily increased, the diagnosis section 52c diagnoses that the fixation of the electromagnetic valve 30 does not occur.

In addition, the above description has been made on the example in which the control flow illustrated in FIG. 6 is executed in parallel for all the electromagnetic valves 30 and the diagnosis of the fixation is made for each of the electromagnetic valves 30. However, the fixation of at least one of the electromagnetic valves 30 in the hydraulic pressure control unit 5 may be diagnosed. In such a case, the current sensor 40 is provided only for the at least one electromagnetic valve 30 that is subjected to the diagnosis of the fixation, for example.

<Effects of Hydraulic Pressure Control Unit>

A description will be made on effects of the hydraulic pressure control unit 5 according to the embodiment of the present invention.

In the hydraulic pressure control unit 5, in the process in which the current value of the current flowing through the coil 30d of the electromagnetic valve 30 is increased at the initiation of applying the current to the coil 30d, the diagnosis section 52c determines whether the current value has exhibited the behavior of being temporarily reduced, and thereby diagnoses the presence or the absence of the fixation of the electromagnetic valve 30. As described above, in the process in which the current value of the current flowing through the coil 30d is increased, the current value exhibits the behavior of being temporarily reduced in the case where the fixation of the electromagnetic valve 30 does not occur, and the current value does not exhibit the behavior of being temporarily reduced in the case where the fixation of the electromagnetic valve 30 occurs. Thus, in the process in which the current value of the current flowing through the coil 30d is increased, it is determined whether the current value has exhibited the behavior of being temporarily reduced. In this way, the presence or the absence of the fixation of the electromagnetic valve 30 can be diagnosed.

Furthermore, according to the processing to diagnose the presence or the absence of the fixation of the above electromagnetic valve 30 by the diagnosis section 52c, it is possible to diagnose the presence or the absence of the fixation of the above electromagnetic valve 30 without relying on change in a parameter (for example, the temperature of the brake fluid in the brake system 10, or the like) that has an influence on the current value of the current flowing through the coil 30d of the electromagnetic valve 30. In this way, for example, compared to a case where the presence or the absence of the fixture of the electromagnetic valve 30 is diagnosed on the basis of a degree of deviation of the detected value of the current value of the current, which flows through the coil 30d, from a value that is set in advance as an assumed current value when the fixation of the electromagnetic valve 30 does not occur, it is possible to appropriately diagnose the presence or the absence of the fixture of the electromagnetic valve 30. Therefore, according to the processing to diagnose the presence or the absence of the fixation of the above electromagnetic valve 30 by the diagnosis section 52c, it is possible to appropriately diagnose the presence or the absence of the fixture of the electromagnetic valve 30.

Preferably, in the hydraulic pressure control unit 5, in the case where the reduced amount of the current value is greater than the reference value at the time when the current value of the current flowing through the coil 30d of the electromagnetic valve 30 is continuously reduced, it is determined that the current value has exhibited the behavior of being temporarily reduced, and it is diagnosed that the fixation of the electromagnetic valve 30 does not occur. Thus, when the reference value is appropriately set on the basis of the specifications of the electromagnetic valve 30 and the brake fluid, for example, it is possible to further appropriately diagnose whether the above current value has exhibited the behavior of being temporarily reduced in conjunction with the movement of the armature 30b of the electromagnetic valve 30. Therefore, it is possible to further appropriately diagnose the presence or the absence of the fixation of the electromagnetic valve 30.

Preferably, in the hydraulic pressure control unit 5, the diagnosis section 52c varies the above reference value in accordance with the temperature. Thus, when the above reference value is varied in accordance with the temperature of the brake fluid in the brake system 10, for example, the reference value can appropriately be set in accordance with a change in the viscosity of the brake fluid. As a result, it is possible to further appropriately determine whether the above current value has exhibited the behavior of being temporarily reduced in conjunction with the movement of the armature 30b of the electromagnetic valve 30. Therefore, it is possible to further appropriately diagnose the presence or the absence of the fixation of the electromagnetic valve 30.

Preferably, in the hydraulic pressure control unit 5, in the case where it is determined that the behavior of the power supply 6, which supplies the power to the coil 30d of the electromagnetic valve 30, has been abnormal in the process in which the current value of the current flowing through the coil 30d of the electromagnetic valve 30 is increased at the initiation of applying the current to the coil 30d, the diagnosis section 52c does not validate the diagnosis result of the fixation of the electromagnetic valve 30. In this way, it is possible to prevent erroneous diagnosis of the presence or the absence of the fixation of the electromagnetic valve 30, which is caused by the abnormal behavior of the power supply 6. For example, it is possible to prevent such diagnosis that the fixation of the electromagnetic valve 30 does not occur in the case where the fixation of the electromagnetic valve 30 occurs and the current value of the current flowing through the coil 30d exhibits the behavior of being temporarily reduced due to the excessively unstable voltage value of the power supply 6. Therefore, it is possible to further appropriately diagnose the presence or the absence of the fixation of the electromagnetic valve 30.

Preferably, in the hydraulic pressure control unit 5, in the case where it is diagnosed that the fixation of the electromagnetic valve 30 occurs, the controller 52 outputs the operation command to make the notification device notify the driver of the diagnosis result. In this way, when the fixation of the electromagnetic valve 30 occurs, it is possible to notify the driver of such fixation and thus to urge the driver to repair the motorcycle 100, for example.

Preferably, the hydraulic pressure control unit 5 is used for the vehicle behavior control system (for example, the brake system 10) of the motorcycle 100. Here, a distance between the channel of the brake fluid and a drive source such as an engine tends to be shorter in the motorcycle 100 than in another vehicle. For this reason, the brake fluid is likely to be heated and reach the high temperature by heat that is generated by the drive source such as the engine. Thus, the gas component of the brake fluid is likely to be vaporized. Accordingly, particularly in the motorcycle 100, the fixation of the electromagnetic valve 30 is likely to occur. Thus, when the hydraulic pressure control unit 5 is used for the vehicle behavior control system of such a motorcycle 100, it is possible to effectively use such an effect that the presence or the absence of the fixation of the electromagnetic valve 30 can appropriately be diagnosed.

The present invention is not limited to each of the embodiments. For example, all or parts of the embodiments may be combined, or only a part of each of the embodiments may be implemented. In addition, an order of the steps may be switched, for example.

What is claimed is:

1. A hydraulic pressure control unit for a vehicle behavior control system, the hydraulic pressure control unit comprising:
   a hydraulic pressure control mechanism that includes a base body and components assembled in the base body, the base body including an electromagnetic valve configured to control a hydraulic pressure generated by a hydraulic fluid for the vehicle behavior control system, the electromagnetic valve including a coil and a corresponding movable armature; and
   a controller configured to:
      control, with a control section of the controller, operation of the components of the hydraulic pressure control mechanism;
      acquire, with an acquisition section of the controller, a measured value of a current flowing through the coil of the electromagnetic valve;
      identify, with a diagnosis section of the controller, a temporary reduction in the measured value when the current flowing through the coil is increased at initiation of applying the current to the coil of the electromagnetic valve, wherein the temporary reduction is a difference in a first measured value of the current at a first time and a second measured value of the current at a second time after the first time; and
      diagnose, with the diagnosis section of the controller, an absence of fixation of the armature relative to the coil when the temporary reduction is greater than a reference value,
   wherein the measured value is continuously reduced from the first time to the second time.

2. The hydraulic pressure control unit according to claim 1, the controller being further configured to:
   vary, with the diagnosis section of the controller, the reference value in accordance with a temperature.

3. The hydraulic pressure control unit according to claim 1, the controller being further configured to:
   diagnose, with the diagnosis section of the controller, a presence of fixation of the armature relative to the coil when the temporary reduction is less than the reference value; and
   output an operation command to a notification device, in response to the diagnosis result indicating that the fixation of the electromagnetic valve has occurred, the operation command configured to cause the notification device to notify the diagnosis result.

4. The hydraulic pressure control unit according to claim 1, wherein the vehicle behavior control system is part of a motorcycle.

5. A hydraulic pressure control unit for a vehicle behavior control system, the hydraulic pressure control unit comprising:
   a hydraulic pressure control mechanism that includes a base body and components assembled in the base body, the base body including an electromagnetic valve configured to control a hydraulic pressure generated by a hydraulic fluid for the vehicle behavior control system; and
   a controller configured to:
      control, with a control section of the controller, operation of the components of the hydraulic pressure control mechanism;
      acquire, with an acquisition section of the controller, a current value of a current flowing through a coil of the electromagnetic valve;
      diagnose, with a diagnosis section of the controller, one of (i) a presence and (ii) an absence of a fixation of the electromagnetic valve by determining whether the current value has exhibited behavior of being temporarily reduced in a process in which the current value is increased at initiation of applying the current to the coil of the electromagnetic valve; and
      not validate a diagnosis result of the fixation of the electromagnetic valve, in response to a determination that behavior of a power supply, which is configured to supply power to the coil of the electromagnetic valve, has been abnormal in the process in which the current value is increased at the initiation of applying the current to the coil of the electromagnetic valve.

* * * * *